Oct. 30, 1962     C. B. STEGMAN     3,061,750
PANCAKE MOTOR
Filed Feb. 27, 1958
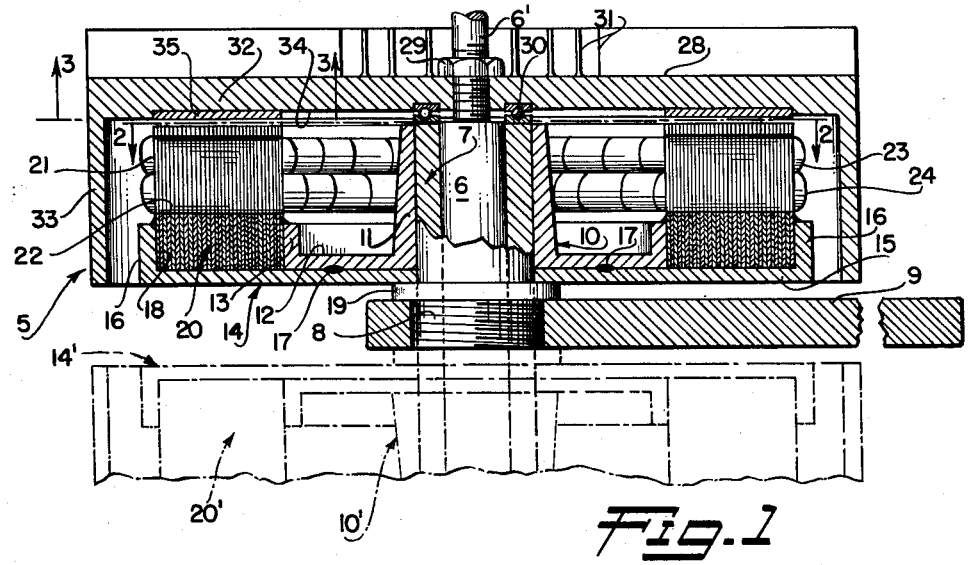
Fig. 1
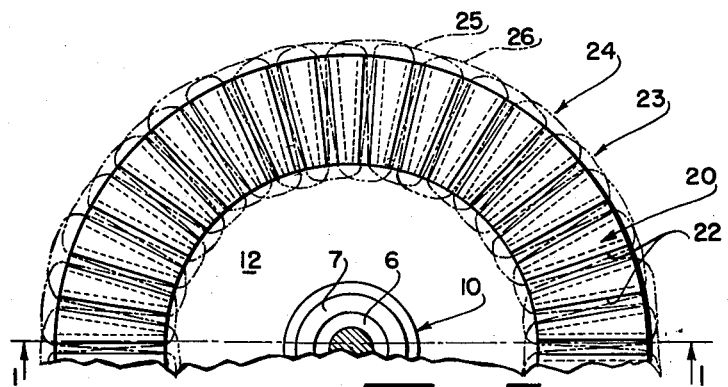
Fig. 2
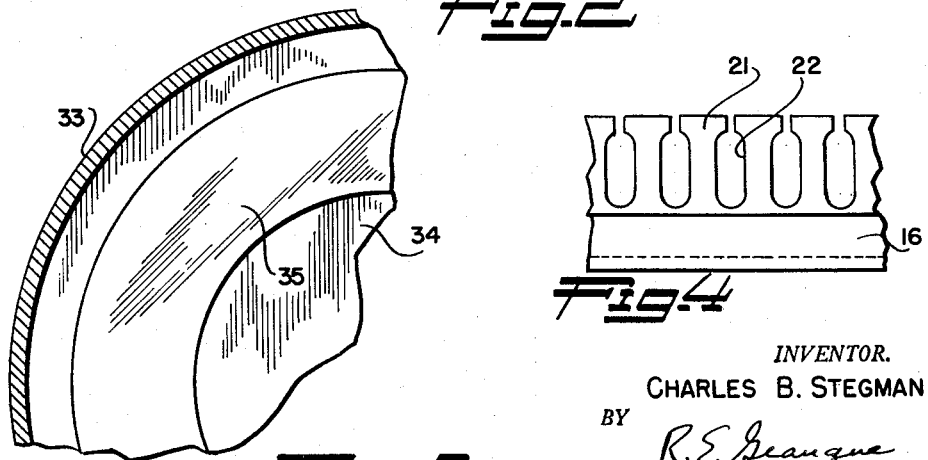
Fig. 3
Fig. 4
INVENTOR.
CHARLES B. STEGMAN
BY R. E. Geanque
Attorney United States Patent Office 3,061,750
Patented Oct. 30, 1962

3,061,750
PANCAKE MOTOR
Charles Burchard Stegman, 5757 Tobias, Van Nuys, Calif.
Filed Feb. 27, 1958, Ser. No. 717,852
2 Claims. (Cl. 310—268)

This invention relates to a pancake motor construction and to a synchronous pancake motor which utilizes a non-grain oriented armature.

In prior types of pancake motors wherein a circular rotor magnet is displaced axially from the windings, the rotor magnet has been constructed of grain oriented magnetic material, and the motor operates as an induction motor since the rotating field produced by the windings is simply inductively coupled with the rotor magnet to produce an output force. The speed of such motors will vary with the load on the motor since the poles produced in the rotor magnet by the winding are not strong enough to lock with the poles of the rotating magnetic field. Because the rotor magnet is in the form of a flat, circular ring, grain orientation along a single direction results in poles in the rotor magnet of different powers and flux densities, and these poles are not of sufficient strength to cause the motor to run as a synchronous motor.

In the present invention, the pancake motor utilizes circular windings and the flat circular ring forming the rotor magnet is displaced axially from the windings by a slight amount. The rotor magnet is secured directly to a rotor for the motor and the rotor is attached directly to the output shaft to provide a very compact construction. The rotor magnet ring is fabricated of a non-grain oriented magnetic material to cause the motor to operate as a synchronous motor. Generally, high cobalt steel alloys can be fabricated with no grain orientation and can be utilized as the rotor magnet material and these alloys can be either rolled or cast. One such alloy is known in the trade as P6 and contains 45–47% cobalt and 5.5–6.5% vanadium. Also, standard 18–36% cobalt magnet steels can be utilized for the rotor magnet material. Since the rotor magnet is constructed as a flat circular ring of highly magnetic material having no grain orientation, the field of the winding forms poles in the rotor magnet of sufficient strength to lock with the rotating poles of the rotating magnetic field to cause the motor to operate as a synchronous motor. Thus, the motor will be capable of producing varying torque output at constant speed. Different speed windings can be incorporated in the motor and upon a change from one winding to another, the poles in the rotor magnet will instantaneously change position to correspond with the poles of the field of the new winding and synchronous operation can thus be obtained from a single motor at various speeds.

It is therefore an object of the present invention to provide a pancake motor having a strong magnetic rotor magnet in the form of a flat ring displaced axially from the stator windings to provide a simple and compact pancake motor construction.

Another object of the invention is to provide such a pancake motor in which the rotor magnet is constructed of a non-grain oriented magnetic material, so that the motor will operate as a synchronous motor.

A further object of the present invention is to provide a pancake motor which can be supplied with a plurality of different windings to produce a number of different speeds.

These and other objects of the invention not specifically set forth above will become readily apparent from the accompanying description and drawings, in which—

FIGURE 1 is a vertical section along line 1—1 of FIGURE 2 showing the pancake motor of the present invention, and illustrating the manner in which two motors can be stacked together;

FIGURE 2 is a horizontal section along line 2—2 of FIGURE 1 illustrating the starting and running windings for one operating speed of the motor;

FIGURE 3 is a horizontal section along line 3—3 of FIGURE 1 illustrating the rotor magnet ring for the motor; and FIGURE 4 illustrates a portion of the laminations for supporting the windings.

Referring to the illustrated embodiment of the invention, the pancake motor 5 has a central shaft 6 rotating in a bearing sleeve 7 which has one end 8 threaded to any suitable stationary motor support 9. A center member 10 has a cylindrical portion 11 secured to the bearing sleeve 7 and has a circular bottom portion 12 carrying an upstanding circular rim portion 13. Also, a circular cup shaped member 14 comprises a base 15 and a rim 16 and the base 15 is secured to bottom portion 12 of member 11 at points 17. The members 10 and 14 form an integral frame stationary with support 9 and provide a circular groove 18 between rims 13 and 16. The support 9 is separated from the base 15 by an enlarged ridge 19 on the bearing sleeve 7.

Laminations 20 for the motor are formed from a single strip of material which is circularly wound to provide a cylinder which will tightly fit within the groove 18. A single layer 21 of the laminations is illustrated in FIGURE 4 and contains slots 22 for the motor windings. It will be apparent that the slots in the layer of least diameter must be closer together than the slots in the layer of greatest diameter so that the slots in all of the layers are in alinement in a radial direction. It is understood that the spacing of the slots progressively farther apart along the strip can be accomplished in a properly controlled punching operation. The inner and outer layers of the laminations are welded or otherwise secured to the rims 13 and 16 respectively, in order to hold the laminations 20 in place.

For purposes of illustration, the slots 22 of the lamination layers contain a first set of skein windings 23 which will produce 360 rotations per minute and a second skein winding 24 which will produce 720 revolutions per minute of the motor. A schematic illustration of winding 23 is illustrated in FIGURE 2 and this winding comprises a running winding 25 and a starting capacitor winding 26 which is displaced one slot from the running winding. In the construction illustrated, there are 40 radial slots for the laminations and the winding 23 results in twenty poles to produce the resulting 360 revolutions per minute. It is understood that the winding 24 will be so constructed to produce ten poles, and that additional or different windings can be also located within the slots of the laminations to provide for other speeds of operation.

The shaft 6 has a reduced end 6′ which is threaded into a central opening in rotor 28 and a lock nut 29 secures the rotor to the reduced shaft end 6′. The rotor 28 is spaced from the end of bearing sleeve 7 by means of ball bearings 30 which permit the rotor to rotate relative to the motor windings. Also, the rotor carries a plurality of impelled blades 31 which serve to circulate the air surrounding the motor. The reduced end 6′ can be extended to rigidly connect with any mechanism to be driven by the motor so that axial movement of the motor shaft cannot take place. It is understood, of course, that the shaft 6 could also be keyed to bearing sleeve 7 in a suitable manner to prevent axial shaft movement.

The rotor 28 is in the form of an inverted cup having a base 32 and a rim 33 which surrounds the stationary laminations 20 and stationary motor windings. The base 32 contains a circular depression 34 which receives at its outer circumference the flat circular rotor magnet ring 35 so that the ring is located directly opposite the laminations 20 and displaced slightly therefrom along the axial line of the motor. As previously mentioned, the ring 35 is constructed of a non-grain oriented, strongly magnetic material, such as the commercially available steel alloys containing a high percentage of cobalt. It is understood that any suitable strong magnetic steel material capable of becoming a permanent magnet and having a non-grain oriented structure can be utilized. Because of the non-grain oriented structure of ring 35, the motor will operate as a synchronous motor in the manner presently to be described.

Because of the compact construction of the motor, two or more motors can be stacked together in the manner illustrated by the dotted lines in FIGURE 1. This can be accomplished simply by extending the bearing sleeve 7 and shaft 6 and securing members 10' and 14' to the bearing sleeve in order to support a second set of laminations 20' containing windings to drive a second rotor (not shown) suitably attached to shaft 6. In such a construction, the shaft output will be twice that obtained from a single motor.

Referring now to the operation of the motor 5, the energization of winding 23 will result in a rotating magnetic field having twenty poles, and at the instant of energization, twenty poles will be produced in the non-grain oriented rotor magnet ring 35. Because of the non-grain orientation, the poles produced in ring 35 will be of sufficient strength to lock with the poles of the rotating field and cause the motor to run as a synchronous motor. Thus, the motor will operate at 360 revolutions per minute regardless of changes of loads on shaft 6', so long as the motor is not overloaded. If it is desired to change the speed of the motor, the winding 23 will be de-energized and winding 24 will be energized to produce a magnetic field having ten poles. This new field will immediately wipe out the previous twenty poles and produce ten poles in ring 35 of sufficient strength to lock with the ten poles of the rotating magnetic field. Thereafter, the motor will run as a synchronous motor at the speed of 720 revolutions per minute. This change in pole position can result since the poles produced in ring 35 are of a semi permanent nature.

As previously stated, the present invention provides a compact pancake motor construction in which different speed windings can be incorporated and which provides for the connection of one or more motors to a single shaft in accordance with the required power output. In the event that a grain oriented material is utilized for ring 35, the motor will still operate satisfactorily as an induction motor and such a ring can be utilized in cases where synchronous speed operation is not required.

Various modifications are contemplated by those skilled in the art without departing from the spirit and scope of the invention as hereinafter defined by the appended claims.

What is claimed is:

1. A hysteresis motor of flat configuration comprising a central output shaft, support means rotatably supporting said shaft and comprising a circular rim spaced from said shaft, circular lamination means positioned by said rim and extending in the axial direction and defining an axially facing annular face, winding means supported by said lamination means and spaced axially from said rim, rotor means secured to said shaft, and a flat circular rotor magnet disc of non-grain oriented magnetic material carried by said rotor means and being closely adjacent but spaced axially from said annular face and within the rotating field of said winding means in order to drive said output shaft and said rotor means.

2. A pancake motor as defined in claim 1 wherein said lamination means comprise a plurality of circular layers each containing spaced slots for said winding means, said slots in said layers being in radial alignment to receive said winding means.

References Cited in the file of this patent

UNITED STATES PATENTS

| | | |
|---|---|---|
| 1,275,665 | Eichbaum | Aug. 13, 1918 |
| 1,595,550 | Howard | Aug. 10, 1926 |
| 2,041,875 | Stoller | May 26, 1936 |
| 2,302,013 | Farkas et al. | Nov. 17, 1942 |
| 2,356,972 | Chubbuck | Aug. 29, 1944 |
| 2,469,808 | Aske | May 10, 1949 |
| 2,691,124 | Aske | Oct. 5, 1954 |

FOREIGN PATENTS

| | | |
|---|---|---|
| 25,969 | Finland | July 2, 1953 |